US007788955B2

(12) United States Patent
Agostini et al.

(10) Patent No.: US 7,788,955 B2
(45) Date of Patent: Sep. 7, 2010

(54) IGNITION SWITCH AND STEERING LOCK DEVICE FOR MOTOR VEHICLES

(75) Inventors: Mauro Agostini, Correggio (IT); Marco Codeluppi, Carpi (IT)

(73) Assignee: Zadi S.p.A., Carpi (IT)

( * ) Notice: Subject to any disclaimer, the term of this patent is extended or adjusted under 35 U.S.C. 154(b) by 330 days.

(21) Appl. No.: 12/021,815

(22) Filed: Jan. 29, 2008

(65) Prior Publication Data
US 2008/0209964 A1   Sep. 4, 2008

(30) Foreign Application Priority Data
Jan. 30, 2007    (IT)    .......................... MO2007A0031

(51) Int. Cl.
*B60R 25/02*    (2006.01)
(52) U.S. Cl. .......................................... 70/186; 70/252
(58) Field of Classification Search ........... 70/182–186, 70/252
See application file for complete search history.

(56) References Cited

U.S. PATENT DOCUMENTS

| 5,343,077 | A  | * | 8/1994 | Yoshida et al. ............. 340/5.64 |
| 6,354,118 | B1 | * | 3/2002 | Frick et al. .................... 70/186 |
| 2005/0183476 | A1 | * | 8/2005 | Feucht et al. ................. 70/186 |
| 2006/0169011 | A1 | * | 8/2006 | Limburg ....................... 70/186 |
| 2007/0006620 | A1 | * | 1/2007 | Fukushima ................... 70/186 |

\* cited by examiner

*Primary Examiner*—Lloyd A Gall
(74) *Attorney, Agent, or Firm*—Pearne & Gordon LLP

(57) ABSTRACT

An ignition switch and steering lock device for motor vehicles, comprising: a main body; an electronic control circuit provided with input/output interfaces; a locking mechanism; a mechanical actuator, for moving the locking mechanism. The locking mechanism is mobile between a locked position in which its action blocks the vehicle steering in a fixed orientation relative to the frame, and an unlocked position in which the elements do not block the rotation of the steering relative to the frame. The locking mechanism can be moved into the locked position only at a minimum steering lock orientation. The device further comprises at least one unlocked position sensor to determine the position of the locking mechanism and at least one steering orientation sensor to determine the orientation of the steering.

11 Claims, 2 Drawing Sheets

IGNITION SWITCH AND STEERING LOCK DEVICE FOR MOTOR VEHICLES

BACKGROUND OF THE INVENTION

The present invention relates to an ignition switch and steering lock device for motor vehicles.

In particular, the device can be applied as an ignition switch and steering lock for motor cycles.

As is known, start-up ignition switch devices, activated using a mechanical key and provided with an anti-theft steering lock function, have been fitted on a majority of motor vehicles and motorcycles for some time. Typically, these devices lock the orientation of the steering by way of a bolt that engages in a bolt seating.

In recent years, an additional anti-theft system has been added to these devices, comprising a so-called "transponder" chip associated with the traditional mechanical key and serving to communicate a radio frequency recognition code to a unit acting to enable the vehicle ignition. These security systems, known as immobilizers, have enjoyed considerable commercial success and are currently very common.

Constant research and development, aimed at improving the reliability of the systems and ease of use, have led to the development of ignition switch and steering lock devices for motor vehicles in which the mechanical key is substituted with an electronic key containing the transponder chip, and the functions activated by the operations of insertion, extraction, and rotation of the key in the lock are controlled by pressing a buttons or manipulating other elements provided for the purpose. Ignition switch and steering lock devices of this sort are referred to as keyless or handsfree.

However, handsfree ignition switch and steering lock devices developed for motor vehicles cannot be adapted for use on motorcycles without modifications.

The standards relating to the use of steering lock devices for motorcycles involves compliance with certain safety requirements. In the majority of motor vehicle steering lock devices the bolt serving to lock the steering is pushed into the bolt seat by a preloaded spring; in motorcycle applications, standards instead require a mechanical movement of the bolt. Once more with reference to the standards it, must only be possible for the bolt to insert into the bolt seat at a well defined orientation of the steering, so that the steering angle must be equal to or greater than 20°.

In addition to compliance with said standards, essential characteristics for an ignition switch and steering lock device for fitting on motorcycles are limited bulk, and high resistance to physical loading and ambient conditions.

From the above it can be understood why the development of handsfree ignition switch and steering lock devices for motorcycles is still under research today.

The aim of the present invention is to provide a handsfree type ignition switch and steering lock device which are particularly suitable to be equipped on motorcycles.

An advantage of the device of the invention is that its operation involves a mechanical movement of the bolt in compliance with safety standards for steering lock devices applied to motorcycles.

A further advantage of the device of the invention is that it does not permit the locking of steering except at specific orientations, again in compliance with said standards.

Further advantages of the device of the invention are its limited bulk and high mechanical strength.

BRIEF DESCRIPTION OF THE DRAWINGS

Further characteristics and advantages will better emerge from the detailed description made herein with reference to the accompanying figures of the drawings, in which.

DESCRIPTION OF THE PREFERRED EMBODIMENTS

Figure 1:
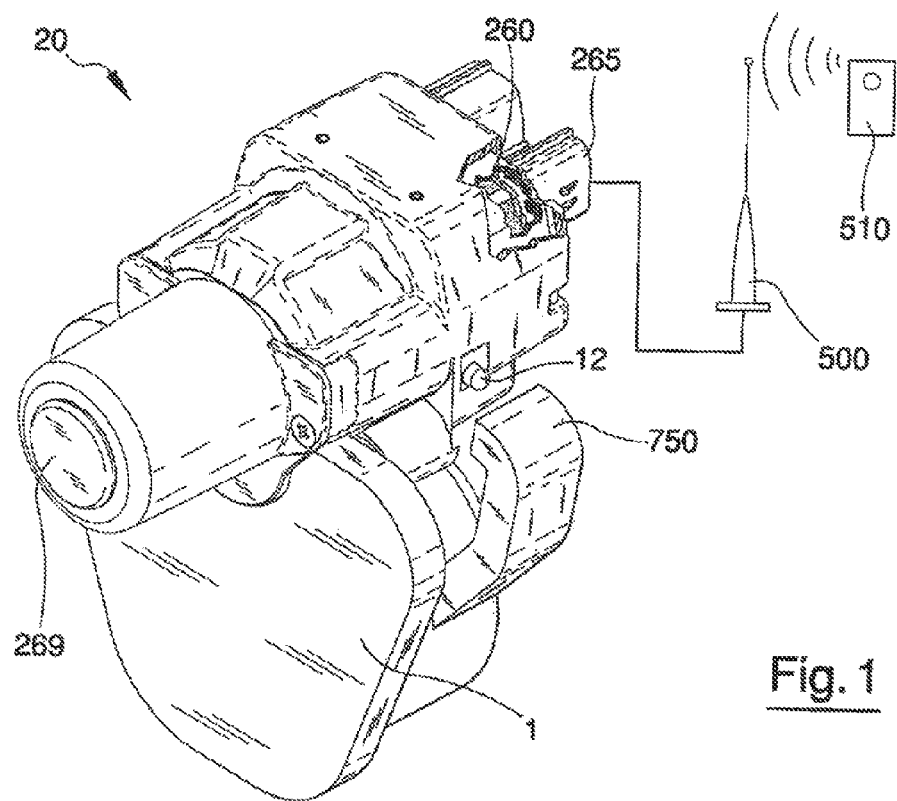
FIG. 1 illustrates the device of the present invention, associated to a motorcycle frame.
Figure 4:
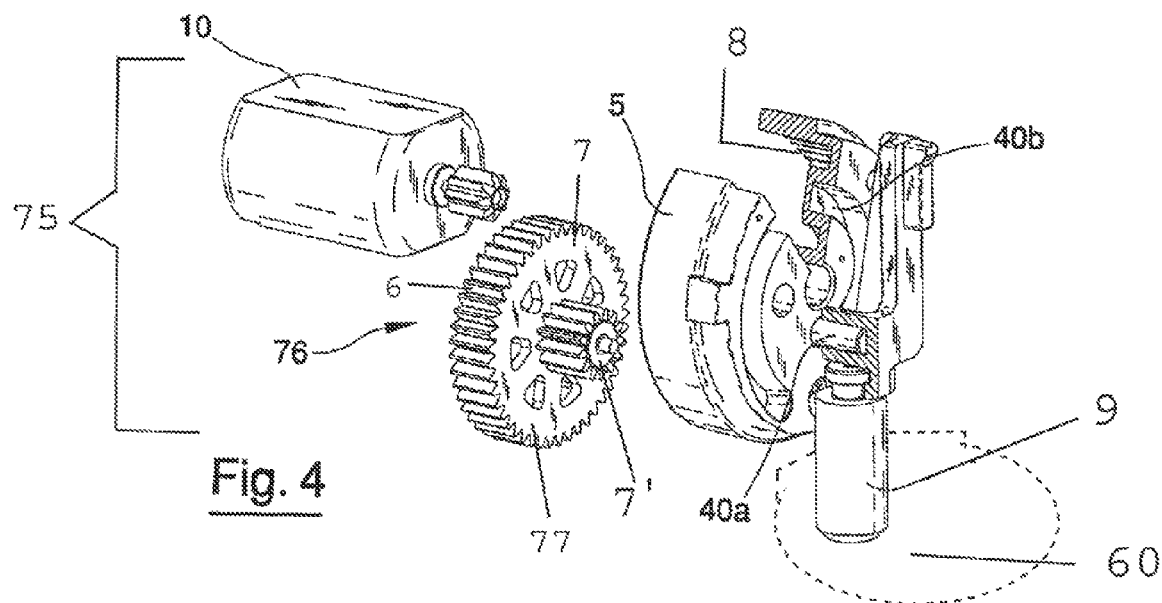
FIG. 4 is an exploded view of the means of transmission of movement to the bolt of the device associated to the mechanical actuator that moves it.

With reference to the figures of the drawingS, 20 denotes in its entirety an ignition switch and steering lock device for motor vehicles according to the present invention, associated to a motorcycle.

The device comprises means for locking 28 for blocking an orientation of the steering relative to the frame; a mechanical actuator 75 for movement of the means for locking; an electronic control circuit 260 for controlling the device, connected to sensors 2, 3, 4 and input/output interfaces 265. These elements are all assembled on a main body 1.

In two further embodiments of the invention, the main body 1 is associated to the frame of the motorcycle, or to the steering sleeve as shown in FIG. 1.

The means for locking 28 are mobile between a locked position (see FIG. 2), in which their action locks the steering of the vehicle at a fixed orientation relative to the frame, and an unlocked position (see FIG. 3) in which the means in for locking 28 do not lock the rotation of the steering relative to the frame. In the device of the invention, the means for locking 28 can be moved from an unlocked position (see FIG. 3) to the locked position (see FIG. 2) only at a minimum steering lock orientation relative to the frame. Preferably the minimum angle of lock will be chosen as a steering angle greater or equal to 20°, in order to comply with the existing standards.

In the preferred embodiment, the means for locking 28 comprise a bolt 9, fixed to a bolt support 27 and mobile in translation with respect to the main body 1 between a lower endrun position and an upper endrun position along longitudinal axis z thereof. In the locked position of the means for locking 28, the bolt is at the lower endrun position thereof (see FIG. 2) and engages in a bolt seating. In the unlocked position of the means for locking 28, the bolt is in the upper endrun position thereof (see FIG. 3). The bolt seating is formed either in the frame 60 or in the steering sleeve of the motorcycle, depending on whether the main body is fitted to the sleeve or to the frame. The insertion of the bolt 9 into the bolt seating thus locks the steering to the motorcycle frame.

The movement of the means for locking 28 is produced by the mechanical actuator 75, which is controlled by the control circuit 260.

In order to exercise control over the mechanical actuator 75, the control circuit 260 must be made aware of the orientation of the motorcycle steering relative to the frame. The control circuit 260 must allow movement of the means for locking 28 from the unlocked position to the locked position only when the at least a lockable orientation of the steering lock is reached. For this purpose, sensors 2, 3, 4 include a steering orientation sensor 2.

In the preferred embodiment, the steering orientation sensor 2 is an electro-mechanical device, comprising a feeler element 12 and means for detecting the configuration of the feeler element. The feeler element 12 is preferably substantially cylindrical in shape, with a longitudinal axis y thereof perpendicular to the longitudinal axis z of the bolt 9. This element is translatingly mobile relative to the main body 1, along the longitudinal axis y thereof and between a first configuration (see FIG. 2), assumed at the at least a lockable steering orientation relative to the frame, and a second configuration (see FIG. 3) assumed in all other steering orientations.

A striker element 750 is associated to the frame or to the steering sleeve of the motorcycle, specifically to the one of the two elements to which the main body of the ignition switch and steering lock device is not associated. Preferably the feeler element 12 interacts by contact with the striker element 750 when in the first configuration thereof, while it does not interact there-with when in the second configuration thereof. Alternatively, the feeler element 12 may interact with the striker element 750 when in the second position and not interact therewith when in the first position. Means for resetting 25 act to return the feeler 12 into the non-interactive configuration with the striker element 750. The striker element 750 can advantageously be a projecting element acting to push the feeler element 12 along an axial translation, and the means for resetting can comprise a preloaded compression spring.

Figure 2:
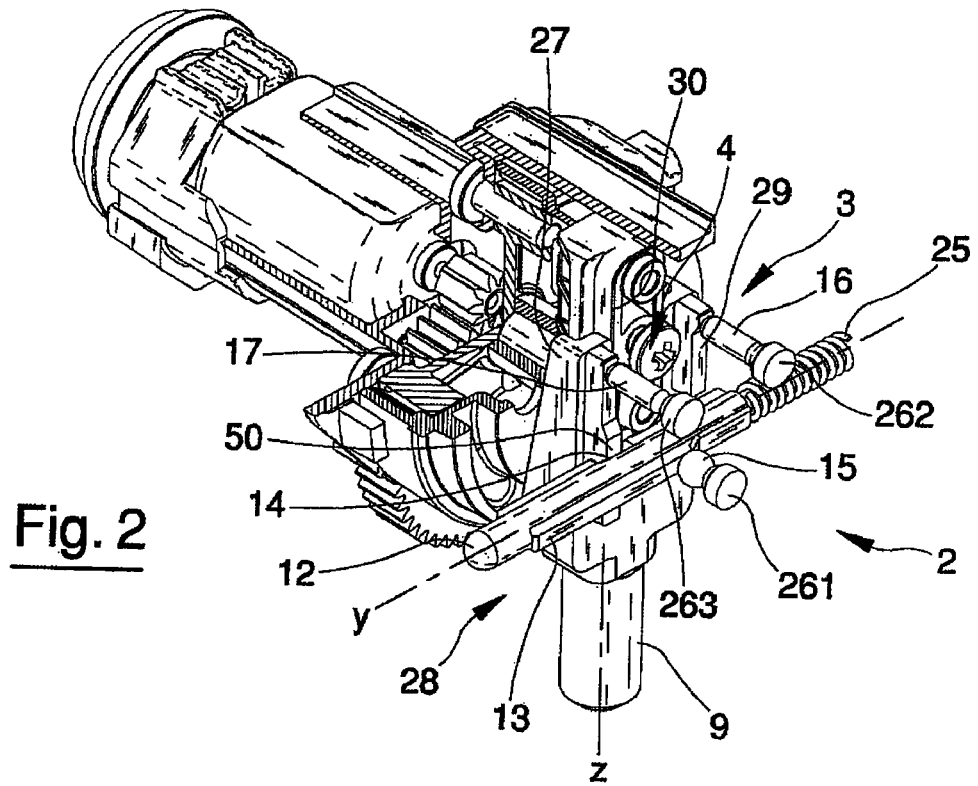
FIG. 2 is a cutaway view of the device in which the bolt can be identified, in a configuration in which it locks the motorcycle steering in relation to the frame.
Figure 3:
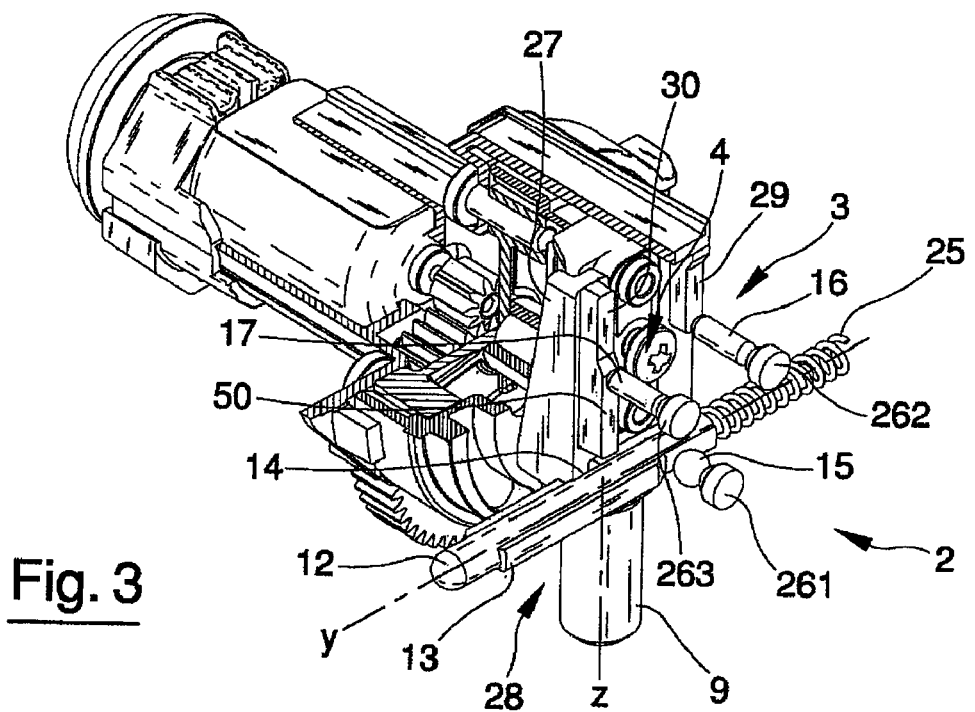
FIG. 3 is a cutaway view of the device in a configuration in which it does not lock the motorcycle steering in relation to the frame.

The feeler element 12 exhibits a transverse notch 14, shaped such as to permit passage of a rib 50 on the bolt support 27, corresponding with the translation of the bolt 9 only when the feeler element 12 is in the first configuration (see FIG. 2). In other configurations of the feeler element 12, the bolt 9 cannot move towards the lower endrun position thereof given that the ribbing 50 fixed to it is blocked by the body of the feeler element 12 (see FIG. 3).

The means for detecting the configuration of the feeler element 12 include a first linear cam 13 longitudinally associated with said feeler element 12 with a raised section that presses a first microswitch 261, interfaced with the electronic control circuit 260, when the feeler element 12 is in the first configuration thereof (or the second configuration in an alternative form of realization). Potentially a first spacer 15 may be interposed between the first linear cam 13 and the first microswitch 261.

In order to control the mechanical actuator 75, the control circuit 260 must detect the position assumed by the means for locking 28, in order to discriminate between the two directions of movement of the actuator. To this end the sensors 2, 3, 4 include an unlocked position sensor 3 and a locked position sensor 4.

The unlocked position sensor 3 is capable of detecting whether the bolt 9 is or is not at the upper endrun position thereof, and consequently whether the means for locking are in the unlocked position.

In the preferred embodiment of the device, the sensor 3 of the unlocked position includes a second linear cam 29, associated to the bolt support 27 and arranged in a parallel direction to the longitudinal axis z of the bolt 9. A raised section of this second cam is designed to press and activate a second microswitch 262, interfaced with the electronic control circuit 260, corresponding to the unlocked position of the means for locking 28. A second spacer 16 may also be interposed between the second linear cam 29 and the second microswitch 262.

The locked position sensor 4 is capable of detecting whether the bolt 9 is or is not at the lower endrun position, and consequently whether the means for locking are in the locked position.

In the preferred embodiment of the device, the locked position sensor 4 comprises a third linear cam 30, associated to the bolt support 27 and arranged is parallel to the second linear cam 29. A raised section of the third cam is designed to press and activate a third microswitch 263, interfaced with the electronic control circuit 260, corresponding with the locked position of the means for locking 28. A third spacer 17 may be interposed between the third linear cam 30 and the third microswitch 263.

Only one sensor, from between the unlocked position sensor 3 and locked position sensor 4, is required for the operation of the device. The presence of the two sensors simultaneously ensures the advantage of the possibility of identifying states of the means for locking in which the bolt 9 is in an intermediate position between its lower endrun position and upper endrun position. Such states, when not transitional, identify a fault in the operation of the device.

The control circuit 260 is also connected to input/output interfaces 265, that enable a connection between the control circuit to the electrical circuit of the motorcycle and a transmission aerial 500. Connection to the electrical circuit of the motorcycle permits the control circuit 260 to transmit an ignition signal to the motorcycle engine, as well as transmitting and receiving information regarding, for example, the state of activation of the motor. Connection to the transmission aerial 500 permits the control circuit to recognize an electronic key 510, equipped with transponder chip, according to the known technology of immobilizer systems.

The control circuit 260 will consequently be capable of changing the state of the motorcycle, this state being determined both by the position of the means for locking 28, and by whether the engine is running or stopped.

The interface by way of which the operator acts on the control circuit 260 in order to modify the state of the vehicle can be advantageously constituted by a single pushbutton switch 269.

The mechanical actuator 75 comprises an electric motor 10, directly interfaced with the electronic control circuit 260; means for transmission 76 that connect the mechanical actuator to the means for locking 28; a gear reducer 77 that operationally connects the means for transmission 76 to the motor 10.

The means for transmission 76 transform the rotary motion in output from the gear reducer 77 into the translation motion of the bolt/bolt support group 9,27. In a preferred embodiment, the means for transmission 76 comprise a drive pin 40*a*, partially housed in a hole in the bolt support 27 and therefore translating together with the latter. The free end of said drive pin 40*a* is housed inside a spiral recess. One of the surfaces of an output wheel 5 of the gear reducer 77 has a spiral recess 40*b* concentric with the wheel. The free end of the drive pin 40*a* is housed inside the spiral recess, along which it is free to slide. Since the bolt/bolt support group 9, 27 is fixed in translation along the longitudinal axis z of the bolt 9, a rotation of the output wheel 5 will cause a sliding motion of the drive pin 40*a* along the spiral recess 40*b* and the consequent axial translation of the bolt/bolt support group 9, 27.

The motor 10 is arranged so that the rotation axis thereof is substantially perpendicular both to the longitudinal axis y of the feeler element 12, and to the longitudinal axis z of the bolt 9. Preferably, the motor will rotate for a fixed period of time when activated by the electronic control circuit 260, and then stop. The direction of rotation of the motor is determined by the electronic control circuit 260 depending on the readings of the unlocked position sensor 3 and of the locked position sensor 4.

The gear reducer 77 has a substantially axial development that follows the axis of rotation x of the motor 10. The gear reducer comprises a pinion 6 keyed on the rotation axis x of the motor 10. This pinion 6 engages a first idle gear wheel 7, this wheel is fixed to a second idle gear wheel T of smaller diameter that in turn engages a cogged crown wheel 8 fixed to the output wheel 5. The rotation of the output wheel 5 is preferably limited by a pawl.

What is claimed:

1. An ignition switch and steering lock device for motor vehicles, comprising: a main body on which other elements comprising the device are assembled, an electronic control circuit for controlling the device, equipped with input/output interfaces; means for locking, mobile between a locked position thereof in which the means block a vehicle steering in a fixed orientation, and an unlocked position thereof in which the means for locking do not block rotation of the steering, the means for locking being movable into the locked position only when the vehicle steering is in at least a locking orientation thereof; a mechanical actuator, for moving the means for locking, being connected operatively to the means for locking and controlled by the electronic control circuit; wherein the device comprises at least a sensor of the unlocked position, for detecting a position of the means for locking and at least a sensor of the steering orientation for determining an orientation of the steering, both the at least a sensors being connected to the electronic control circuit; the sensor of steering orientation comprising a feeler element and means for detecting a configuration of the feeler element, the feeler element being mobile, in relation to the main body, between a first configuration of the feeler element, assumed at a minimum steering lock orientation, and a second configuration of the feeler element, assumed at other steering orientations, the feeler element interacting by contact with a striker element, means for resetting also being provided for returning the feeler element into a configuration thereof of relative to the striker element and wherein the main body is associated with the vehicle steering, the means for locking comprising a bolt which is mobile in translation along a longitudinal axis thereof, the bolt engaging with a vehicle frame in the locked position of the means for locking, the striker element being a raised element solidly constrained to the vehicle frame and designed to interact contactingly with the feeler element at the at least a minimum steering lock orientation; the feeler element being substantially cylindrical in shape and is mobile along a longitudinal axis thereof which is substantially perpendicular to the longitudinal axis of the bolt, the feeler element exhibiting a transversal notch permitting passage, at only the locked position of the feeler element, of a rib fixed to the bolt.

2. The device of claim 1, wherein, in the second configuration thereof, the feeler element interferes with the means for locking in order to prevent any movement from the unlocked position to the locked position thereof.

3. The device of claim 2, wherein the means for detecting the configuration of the feeler element of the steering orientation sensor comprise a first microswitch activated by a first linear cam solidly constrained to the feeler element.

4. The device of claim 3, wherein the sensor of the unlocked position comprises a second microswitch activated by a second linear cam solidly constrained to the means for locking and detects a taking on of the unlocked position by the means for locking.

5. The device of claim 4, wherein the device comprises a sensor of the locked position, connected to the electronic control circuit, and cooperating with the sensor of the unlocked position in order to detect a position of the means for locking, the sensor of the locked position comprising a third microswitch associated to a third linear cam, which third linear cam is solidly constrained to the means for locking, and which a third microswitch detects a taking-on of the locked position by the means for locking.

6. The device of claim 5, wherein the main body is associated to the vehicle frame, the means for locking comprising a bolt which is mobile in translation along a first axis, the bolt engaging with the vehicle steering in the locked position of the means for locking, the striker element being a raised element solidly associated with the vehicle steering and designed to contactingly interact with the feeler element at the minimum steering lock orientation.

7. The device of claim 6, wherein the mechanical actuator comprises an electric motor and means for transmission, connected to each other by a gear reducer, the means for transmission being associated to the means for locking and being designed to convert a rotary motion of the electric motor into a translation motion of the bolt.

8. The device of claim 7, wherein the means for transmission include a spiral recess, constrained to an output wheel of the gear reducer, internally of which spiral recess a drive pin engages and is solidly constrained to the bolt in translation along the longitudinal axis thereof.

9. The device of claim 8, wherein the gear reducer has a substantially parallel to a rotation axis of the motor, the rotation axis of the motor being substantially perpendicular both to the longitudinal axis of the feeler element, and to the longitudinal axis of the bolt.

10. The device of claim 9, wherein the device comprises a pushbutton switch, actionable by the operator and interfaced with the electronic control circuit.

11. The device of claim 10, wherein the input/output interfaces of the electronic control circuit are arranged to connect to an electronic circuit of the vehicle and to a transmission antenna designed to communicate with an electronic key.

* * * * *

UNITED STATES PATENT AND TRADEMARK OFFICE
CERTIFICATE OF CORRECTION

PATENT NO. : 7,788,955 B2  Page 1 of 1
APPLICATION NO. : 12/021815
DATED : September 7, 2010
INVENTOR(S) : Mauro Agostini and Marco Codeluppi It is certified that error appears in the above-identified patent and that said Letters Patent is hereby corrected as shown below:

In column 6, line 28, being line 6 in Claim 6, please delete "solidly".

In column 6, line 43, being line 1 in Claim 9, after "reducer has a", please insert -- rotation axis --.

Signed and Sealed this

Thirtieth Day of November, 2010

David J. Kappos
*Director of the United States Patent and Trademark Office*